Feb. 1, 1966 YAO T. LI 3,232,110
MASS FLOW METER
Filed Jan. 24, 1962
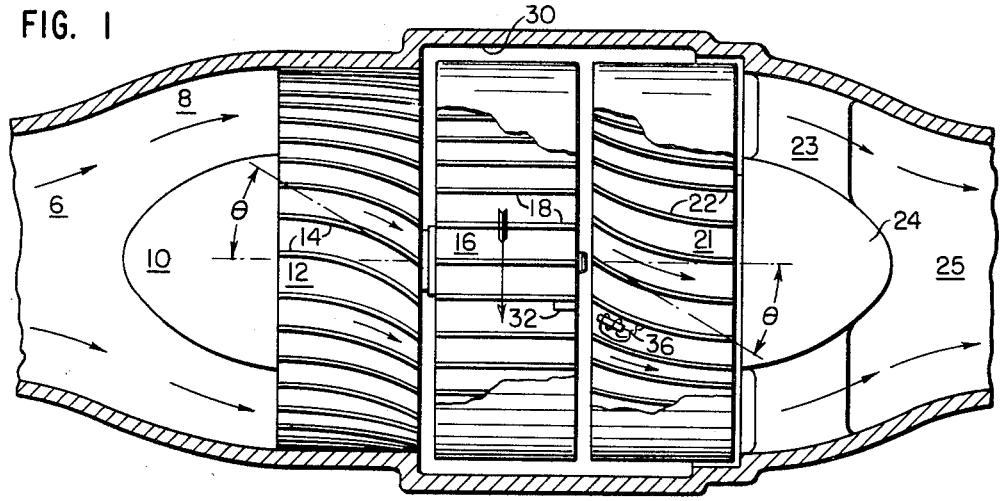
FIG. 1
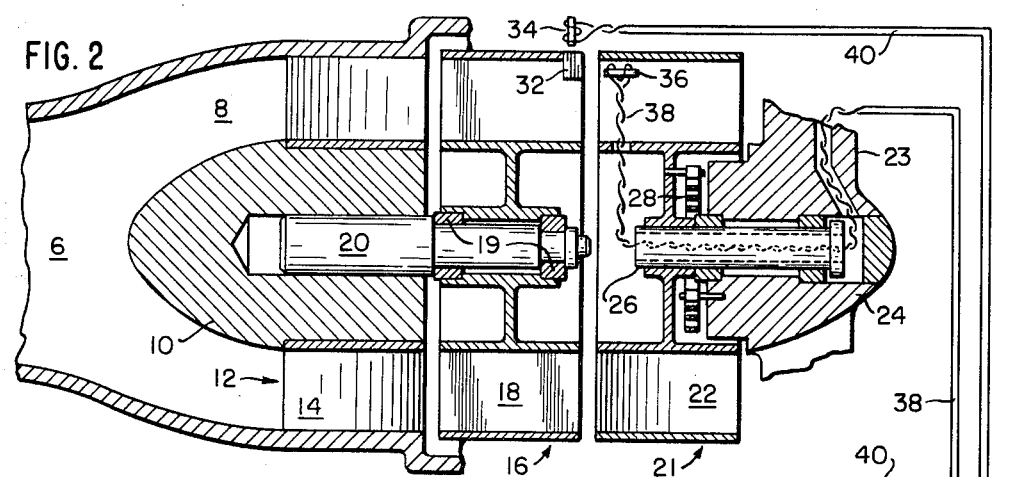
FIG. 2
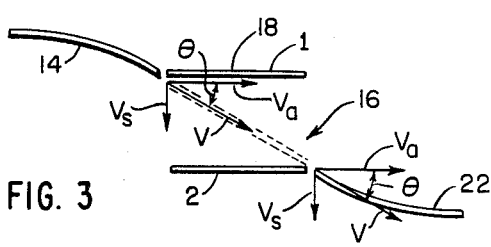
FIG. 4
FIG. 3
INVENTOR.
YAO TZU LI
BY
*Kenway, Jenney & Hildreth*
ATTORNEYS

United States Patent Office 3,232,110
Patented Feb. 1, 1966

3,232,110
MASS FLOW METER
Yao T. Li, South Lincoln, Mass.
(42 Carleton St., Cambridge 42, Mass.)
Filed Jan. 24, 1962, Ser. No. 168,347
4 Claims. (Cl. 73—231)

The present invention relates to mass flow meters.

In many applications it is desirable to measure true mass rate of flow of fluids by direct reading and without requiring calibrations or corrections for density or viscosity of the fluids. Various proposals have been made for direct measuring devices, but most of these have serious disadvantages in one respect or another, frequently by reason of dependence on density or viscosity or because they require mechanically driven rotors.

The object of the present invention is to provide a mass rate flow meter which does not require a rotor driven from an external power supply, and in which the measurement is not affected to any appreciable extent by the density or viscosity of the fluid.

In the accompanying drawings FIG. 1 is an elevation, partly in section, of the preferred form of flow meter;

FIG. 2 is a sectional elevation of the vane and rotor assemblies; and

FIGS. 3 and 4 are diagrams to illustrate the principle of operation of the apparatus.

In FIG. 1 the fluid coming from the left through conduit 6 passes into an annular chamber 8. The flow into the chamber 8 is guided by a cone 10. From the chamber 8 the flow is directed in a substantially axial direction into a guide chamber 12. The guide chamber has a series of fixed vanes 14 having the curvature generally shown in FIG. 1; that is, are smoothly curved to cause the fluid to exit therefrom at an angle from the longitudinal indicated by $\theta$, which is shown as being an angle of about 30°, although any angle over a fairly wide range may be used. Essentially the vanes may be made with radial elements so that the exit angle $\theta$ at any given radius is an angle whose tangent is proportional to the radius.

The fluid emerges from the vanes 14 into a wheel 16 having approximately the same inner and outer radii as the guide chamber 12. The wheel 16 is provided with blades 18, which are preferably flat blades arranged in radial planes.

The wheel 16 is free to rotate on bearings 19 over a stud 20 which is mounted in the cone 10. The wheel 16 is arranged to be freely rotated by the fluid entering from the vanes 14 and it is therefore desirable that the shaft be journaled in bearings of low friction.

The fluid emerging from the wheel 16 enters a guide member or rotor 21 which is elastically mounted for a limited angular movement. The rotor has a series of vanes 22 similar to the vanes 14 of the entrance guide chamber except that they are angled in the reverse direction, that is, so that they accept the fluid from the wheel 16 without shock and remove from the fluid the spin imparted by the vanes 14. As shown in the drawing the vanes are shaped to give a substantially axial flow of fluid at exit. The fluid flows from the rotor 21 into an annular chamber 23 similar to the chamber 8 and formed by an exit cone 24. The chamber 23 then converges into an exit conduit 25 similar to the entrance conduit 6. The cone 24 is supported by webs 27.

The rotor 21 is mounted on a shaft 26 and its movement is restricted by a spring 28 of spiral form. The spring constant is preferably such that the rotor 21 will have a movement somewhat less than one full revolution under conditions of maximum mass flow rate.

The outer edges of the blades 18 of the wheel 16 are enclosed in a guard ring or shroud 40, and the outer edges of the vanes 22 are enclosed within a guard ring or shroud 42 of the same diameter. The entrance conduit 6 itself forms a shroud around the entrance vanes 14 over most of their length, and this is connected to an outer casing 30 separated by a substantial clearance space from the shrouds 40 and 42.

The operation of the device is illustrated by the diagram of FIG. 3. Owing to the shape of the vanes 14 the fluid emerges from the guide chamber 12 at an angle $\theta$ to the axial. The exit velocity from the guide chamber is represented by the vector V and this may be resolved into an axial component $V_a$ and a tangential or spin component $V_s$. Assuming an ideal frictionless mounting for the turbine wheel 16, the wheel will spin at a velocity represented by $V_s$, and the fluid will enter the blades 18 without shock. Relative to the blade the velocity is purely axial. A particle of fluid entering a blade on the left when the blade is in position 1 will exit from the blade when the latter reaches position 2. In effect the fluid is guided by the blade 18 as if it were a fixed deflecting vane formed as an extension of vane 14 as shown by the dotted lines. Thus the velocity of the fluid leaving the wheel 16 is represented by the vector V having the same axial and tangential components $V_a$ and $V_s$, so that the entrance angle of the fluid into a vane 22 is also the angle $\theta$. By reason of the spin component $V_s$ the rotor 21 is subjected to torque and it will take an angular position determined by the mass flow rate.

The vanes of the rotor 21 are constructed as a counterpart of the vanes 14 except for reversal of direction. The vanes 22 straighten out the flow and discharge the fluid axially into the annular chamber 22.

Although it is desirable to have no friction at all in the bearing of the wheel 16 so that the wheel speed is the same as the rotation speed of the fluid at the exit of guide vane 14, the most important feature is the exit angle of the wheel blade 18. This angle should be substantially zero with respect to the axis so that the wheel speed is a true measure of the fluid rotational speed entering the rotor 21.

Similarly the exit angle of the blade 22 of rotor 21 is substantially zero with respect to the flow axis, so that the rotational speed of the fluid upon leaving the blade 22 of rotor 21 is substantially reduced to zero. Because of these two effects the change of angular momentum of the fluid in the flow through the rotor 21 is proportional to the rotational speed of the wheel. This change of angular momentum is equal to the torque acting on the rotor. From this the following equation is derived:

$$T = W\omega r^2 = AK \qquad (1)$$

where
W = mass rate flow
$\omega$ = angular speed of wheel 16
r = mean effective radius of flow passage from the center
T = torque
A = angular displacement
K = spring constant Equation 1 may be solved for mass rate flow:

$$W = \frac{A}{\omega} \frac{K}{r^2} \qquad (2)$$

K is constant. The mean effective radius $r$ is constant for homogeneous fluids, and is sensibly constant under all conditions if the height of a blade or vane is not large in comparison with the outer radius, or stated in another way, the ratio of outer to inner radius of a blade or vane is not greater than about 2 to 1.

Since A is an angle and $\omega$ is an angular velocity, this quantity has the dimensions of time, and is in fact the elapsed time taken by the wheel 16 to rotate through the angle A. The angular velocity of the wheel is not constant but varies with the flow rate.

The elapsed time of the motion of the wheel 16 through the angle A may be measured by any suitable means, as for example, by the use of a device which measures the beginning of the time interval by the passage of a fixed point on the wheel in relation to a fixed point on the casing and the termination of the interval by the passage of said fixed point on the wheel past a fixed point on the rotor 21. An illustrative form of device for this purpose is shown in FIGS. 2 and 4. A small permanent magnet 32 is carried by the wheel 16. Once each revolution it comes opposite a coil 34 which is mounted in a fixed position on the casing. Thus a pulse is generated in the coil 34 once in each revolution of the wheel. A second coil 36 is carried by the rotor 21 and it is positioned close to the path of the magnet 32 so that a pulse is generated in coil 36 on each revolution. Since the rotor 21 does not rotate but has only a limited angular movement the leads 38 from the coil 36 may be carried out through the shaft 26 which is hollow.

The leads 38 from coil 36 and leads 40 from coil 34 are connected to an elapsed time measuring device 42, which is triggered "on" and "off" by the successive pulses. The elapsed time measuring device 42 may be a meter or recorder of any suitable form, examples of which are well known to those skilled in this art. The device may be calibrated to read directly in terms of mass flow rate, since the rate is proportional to the elapsed time, and any suitable integrating devices may be provided to indicate total flow, if desired.

In the foregoing analysis a frictionless condition is assumed, that is, that no energy is taken out of the fluid by reason of the rotation of the wheel 16 or the action of maintaining the angular displacement of the measuring rotor 21 against the force of the spring 28. Actually some friction effects will exist but these can be kept small by suitable design.

The meter of the present invention has a low viscosity effect; that is, the error due to viscosity of the fluid is small. This is because the fluid rotational speed at the exit of the wheel is substantially the same as the rotational speed of the fluid entering the torque measuring rotor 21. Because of this, there is no shear or viscosity moment between the two members. For this reason the deflecting angle A described above is only influenced by momentum change. To further reduce the viscosity effect the clearance between the wheel and the casing 30 is made sufficiently wide, and the inlet angle of blade 22 can be made slightly less than the exit angle of blade 14 to allow for some slowing down of wheel speed.

Although the invention has been described in the best embodiment now known, it may be varied in ways that will be apparent to those skilled in the art. The invention operates on the principle of imparting angular momentum to a fluid and utilizing the angular momentum to turn an elastically mounted rotor into a position to measure the mass rate of flow. Although vanes have been shown as a means of introducing angular momentum, this may be done in ways known to those familiar with the art of fluid flows, as for example, by scroll chambers.

The principles of the invention are applicable to fluids of any characteristics, although the design features will naturally be different for meters constructed, for example, for measuring flows of gases and heavy liquids. Thus the function of the wheel 16 is to provide a means for measuring the elapsed time taken by a particle traversing the path indicated in FIG. 3. Hence for low mass flow rates, as with gases, the blades 18 will usually be long, whereas with liquids the blades may be short. In general also, the vane angle $\theta$ will be larger for gases than for liquids.

Having thus described my invention, I claim:

1. A mass rate flow meter comprising an inlet chamber for a fluid, first guide means for imparting to the fluid a tangential component of velocity, from the first guide means at a first angle $\theta$ with the longitudinal axis of the meter, a freely mounted wheel to be rotated by the fluid at a speed corresponding to said tangential component of fluid velocity, elastically supported second guide means to receive the fluid from the wheel, the inlet portions of said elastically supported guide means being positioned substantially at the angle $\theta$ with respect to its axis of rotation, whereby the fluid exiting from said freely mounted wheel enters said elastically supported guide means with a minimum of shear, the exit portions of said elastically supported guide means being aligned to remove the tangential component of velocity from the fluid and undergo an angular displacement through the torque imparted by the fluid, and means for determining the mass rate of flow as a function of the angular velocity of the wheel and the angular displacement of said second guide means.

2. A mass rate flow meter comprising an entrance guide chamber having a plurality of vanes to impart a tangential component of velocity to an inner fluid so that the fluid leaves said entrance guide chamber at an angle $\theta$ with respect to the longitudinal axis of the mass rate flow meter, a wheel having blades into which the fluid is directed from the guide chamber, means for freely mounting the wheel for a rotational velocity corresponding to the tangential velocity, an exit guide member having a plurality of vanes to receive the fluid from the wheel and shaped to remove the tangential component of velocity from the fluid, the vanes in the entrance portion of said exit guide member being configured substantially at the angle $\theta$ with respect to the longitudinal axis of the mass rate flow meter, means for elastically mounting the exit guide member to allow angular displacement thereof to a position determined by the torque imparted by the fluid, and means for measuring the mass rate of flow as a function of the angular velocity of the wheel and the angular displacement of the guide member.

3. A mass rate flow meter comprising an entrance guide chamber having a plurality of vanes to impart a tangential component of velocity to an entering fluid, the vanes being configured so that the fluid exits from said entrance guide chamber at an angle $\theta$ with respect to the longitudinal axis of the mass rate flow meter, a wheel having blades into which the fluid is directed from the guide chamber, means for freely mounting the wheel for a rotational velocity corresponding to the tangential velocity of the fluid, an exit guide member having a plurality of vanes to receive the fluid from the wheel and shaped to remove the tangential component of velocity from the fluid, the vanes in the entrance portion of said exit guide member being configured substantially at the angle $\theta$ with respect to the longitudinal axis of the mass rate flow meter, means for elastically mounting the exit guide member to allow angular displacement thereof to a position determined by the torque imparted by the fluid, and means for measuring the time taken for the wheel to rotate through said angular displacement as a measure of mass rate flow.

4. A mass rate flow meter comprising an entrance guide chamber having a plurality of flat guide blades in radial planes to impart a tangential component of velocity to an entering fluid, the fluid leaving said entrance guide chamber at an angle $\theta$ with respect to the longitudinal axis of the mass rate flow meter, a wheel having blades into which the fluid is directed from the guide chamber, means for freely mounting the wheel for rotational velocity corresponding to the tangential velocity of the fluid, an exit guide member having a plurality of flat blades arranged in radial planes to remove the tangential component of velocity from the fluid, the angle of the entrance portion of said blades being substantially at the angle $\theta$ with respect to the longitudinal axis of the mass rate flow meter, means for elastically mounting the exit guide member to allow angular displacement thereof to a position determined by the torque imparted by the fluid, and means for measuring the time taken for the wheel to rotate through said angular displacement as a measure of mass rate of flow.

References Cited by the Examiner

UNITED STATES PATENTS

| | | | |
|---|---|---|---|
| 2,714,310 | 8/1955 | Jennings | 73—194 |
| 2,934,947 | 5/1960 | Buck | 73—231 |
| 2,943,487 | 7/1960 | Potter | 73—231 |
| 3,063,295 | 11/1962 | Dowdell | 73—194 |
| 3,164,017 | 1/1965 | Karlby et al. | 73—231 X |

FOREIGN PATENTS 227,359  3/1960  Australia.

RICHARD C. QUEISSER, *Primary Examiner.*

ROBERT L. EVANS, DAVID SCHONBERG,
*Examiners.*